(12) United States Patent
Okamoto et al.

(10) Patent No.: US 7,523,659 B2
(45) Date of Patent: Apr. 28, 2009

(54) FLOW MEASUREMENT APPARATUS

(75) Inventors: Yuki Okamoto, Hitachinaka (JP); Shinya Igarashi, Naka (JP); Chihiro Kobayashi, Naka (JP); Masatomo Ide, Hitachinaka (JP); Takeshi Morino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/743,979

(22) Filed: May 3, 2007

(65) Prior Publication Data
US 2007/0256493 A1   Nov. 8, 2007

(30) Foreign Application Priority Data
May 8, 2007   (JP) .............................. 2006-128863

(51) Int. Cl.
G01F 1/68   (2006.01)
(52) U.S. Cl. .................................... 73/202.5
(58) Field of Classification Search ............... 73/202.5, 73/204.26, 204.21, 204.22
See application file for complete search history.

(56) References Cited

U.S. PATENT DOCUMENTS

| | | | |
|---|---|---|---|
| 5,696,321 A | 12/1997 | Igarashi et al. | |
| 6,820,479 B2 * | 11/2004 | Roeckel et al. | 73/202.5 |
| 6,851,311 B2 * | 2/2005 | Nakada et al. | 73/204.26 |
| 6,915,688 B2 * | 7/2005 | Kato et al. | 73/202.5 |
| 6,945,105 B2 | 9/2005 | Pesahl et al. | |
| 7,032,446 B2 * | 4/2006 | Nakada et al. | 73/202.5 |
| 7,260,986 B2 * | 8/2007 | Lenzing et al. | 73/204.21 |
| 7,305,877 B2 * | 12/2007 | Beyrich et al. | 73/202.5 |
| 2003/0159501 A1 | 8/2003 | Renninger et al. | |
| 2005/0252289 A1 | 11/2005 | Kitahara et al. | |
| 2006/0016254 A1 | 1/2006 | Okuda et al. | |
| 2007/0089503 A1 | 4/2007 | Nakano et al. | |

FOREIGN PATENT DOCUMENTS

| | | |
|---|---|---|
| CN | 1135044 A | 11/1996 |
| EP | 0 588 626 A2 | 3/1994 |
| EP | 0685713 A2 | 12/1995 |
| EP | 0 735 349 A1 | 10/1996 |
| EP | 1179726 A2 | 2/2002 |
| JP | 2004-037131 A | 2/2004 |
| WO | 2004113848 A1 | 12/2004 |

OTHER PUBLICATIONS

European Search Report dated Jul. 15, 2008 (Four (4) pages).
Chinese Office Action mailed Jun. 20, 2008.
European Search Report mailed Sep. 25, 2008.

* cited by examiner

*Primary Examiner*—Jewel Thompson
(74) *Attorney, Agent, or Firm*—Crowell & Moring LLP

(57) ABSTRACT

In a thermal type flow rate measurement apparatus comprising a sub-passage having a detour passage and a hole just before a flow rate measuring part, for preventing its output value from falling onto a negative side when the flow rate is abruptly changed, a slit is formed downstream of a flow rate detecting element located after the detour passage. The slit hole may be arranged between the flow rate detecting element and the outlet port part, and may be opened between a wall surface side and a recess part. Thereby, it is possible to prevent the output value from falling in the negative side upon rise-up thereof.

9 Claims, 8 Drawing Sheets

FLOW MEASUREMENT APPARATUS

FIELD OF THE INVENTION

The present invention relates to a flow rate measurement apparatus for detecting a flow rate of gas, and in particular to a flow rate measurement apparatus in which the gas is partly fed into a sub-passage provided therein with a flow rate measurement portion so as to measure a flow rate of gas.

DESCRIPTION OF RELATED ART

A heat resistance element type flow rate measurement apparatus which is fitted in an intake duct of a vehicle, has a role of measuring a flow rate of intake air. The intake air flows usually through the intake duct in a vehicle in association with operation of an accelerator, but water drops are inevitably led into the intake duct together with the gas in a rainy whether condition or the like. Should the water drops impinge upon the heat-resistance element serving as a flow rate detecting element, the amount of heat radiation would becomes excessive, resulting in occurrence of measurement error since the heat radiation to water is large in comparison with that to air. JP-A-2004-37131 proposes a flow rate measurement apparatus which comprises a detour portion provided upstream of a heat-resistance element to form a passage for separating the water drops from the air under centrifugal force, in order to solve the above-mentioned problems. Further, the detour portion provided in the passage is formed therein with a drain hole for draining the water therefrom, otherwise the water would be soon pooled therein.

Upon abrupt acceleration of the vehicle, the pressure in the sub-passage would become higher around the drain hole located in the sub-passage just upstream of the detour portion since the flow rate of intake air should be abruptly changed in the case of the conventional flow rate measurement apparatus in which the sub-passage has the detour portion, resulting in lowering of pressure in a main passage within the body. Thus, the air would flow out in an intake pipe from the sub-passage through the drain hole, and accordingly, the amount of the air flowing to the detecting element would be decreased. In particular, an unsteady flow caused when the flow rate of the air is abruptly changed, would greatly deteriorate the accuracy of detection of the heat-resistance type flow rate measurement apparatus.

The flow of the air around the sub-passage is greatly different between in the steady flow condition and in the unsteady flow condition caused by an abrupt change in flow rate. FIG. 9 shows a result of analysis, by means of CAE, of the air flow around the sub-passage just before and after the abrupt change of the flow rate, that is, the top and middle graphs exhibit flow rates in the main passage and the sub-passage, respectively, when the flow velocity (flow rate) is abruptly increased, and the bottom views show flow rates vectors indicated by arrows. In the steady flow condition (−50 to 0 ms), the separation of the air is caused in the outlet part of the sub-passage so that the pressure is decreased therearound, and accordingly, the air is liable to flow out from the outlet part. Thus, air is fed to the heat-resistance portion by a sufficient flow rate (flow velocity). On the contrary, in the course of the abrupt change in flow rate (0 to 50 ms), the separation of the air at the outlet part becomes thinner in the flow of the air around the sub-passage, resulting in such a condition that the flow of the air in the sub-passage is blocked. Thus, the air can hardly flow out from the outlet part, and as a result, the outflow of the air from the drain hole provided in the detour portion is increased. Further, FIG. 10 shows a result of analy-sis by means of CAE similar to the above with such a configuration that the drain hole is blocked, that is, the figure shows an air flow in a steady-state condition and an air flow in a transient condition. It is found from the drawing that the flow velocity around the measuring portion does not decrease even in either one of these conditions, and accordingly, it has been confirmed that the above-mentioned matter is mainly caused by the provision of the drain hole. Thus, the present inventors have encountered a new problem of deterioration of accuracy of detection caused in a unsteady (transient) flow condition by the provision of the drain hole.

BRIEF SUMMARY OF THE INVENTION

An object of the present invention is to provide a flow rate measurement apparatus having a drain hole, which can restrain deterioration of accuracy of detection in an unsteady (transient) flow condition.

The above-mentioned object can be achieved by a flow rate measurement apparatus comprising promoting means for promoting a flow around a sensor in a sub-passage.

Further, the above-mentioned object can be achieved by a flow rate measurement apparatus comprising a passage connecting between a sub-passage on the side near to the outlet side but remote from a sensor, and a main passage.

According to the present invention, with the flow rate measurement apparatus having the drain hole, it is possible to restrain accuracy of detection from being deteriorated in a unsteady (transient) condition.

Other objects, features and advantages of the invention will become apparent from the following description of the embodiments of the invention taken in conjunction with the accompanying drawings.

DETAILED DESCRIPTION OF THE INVENTION

Detailed description will be hereinbelow made of the present invention in the form of preferred embodiments with reference to the accompanying drawings.

Embodiment 1

Figure 1:
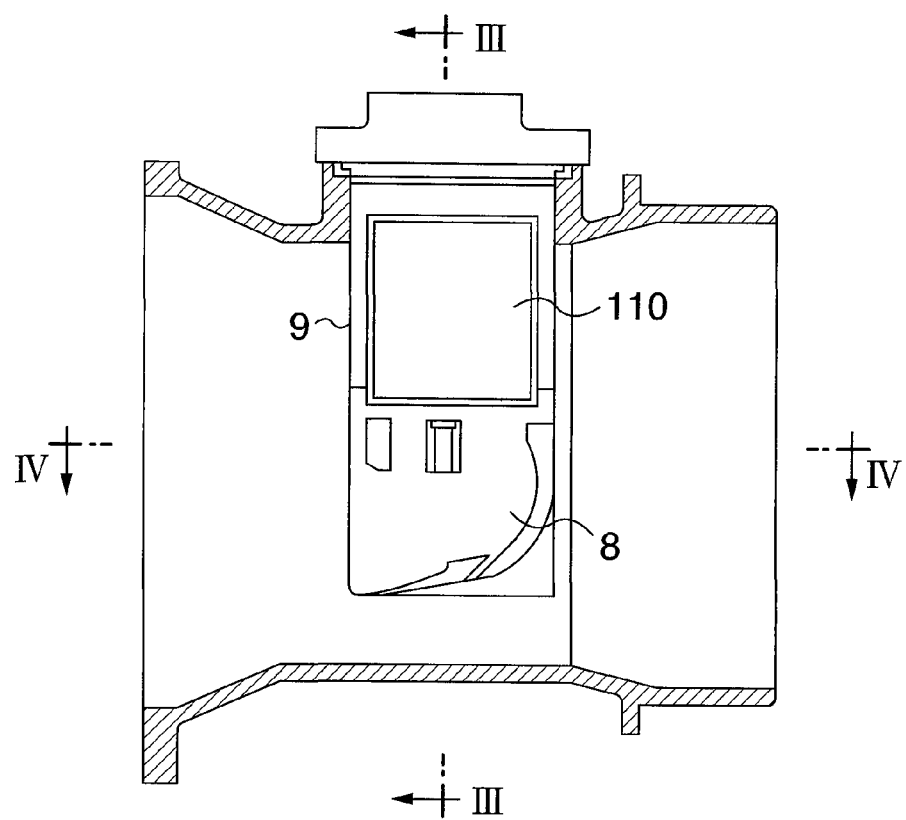
FIG. 1 is a vertical sectional view, with respect to a flowing direction, illustrating a flow rate measurement apparatus according to an embodiment of the present invention.
Figure 2:
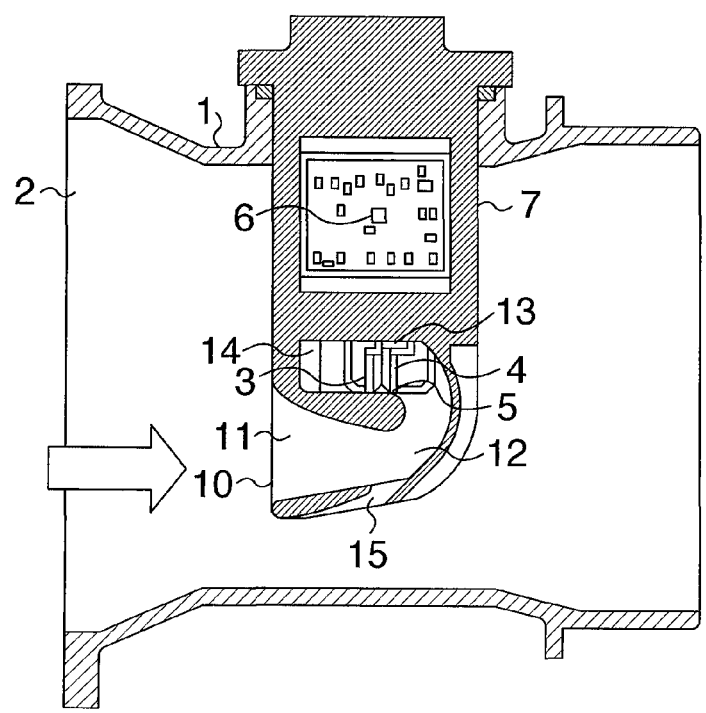
FIG. 2 is a vertical sectional view, with respect to the flowing direction, illustrating the flow rate measurement apparatus in FIG. 1.
Figure 3:
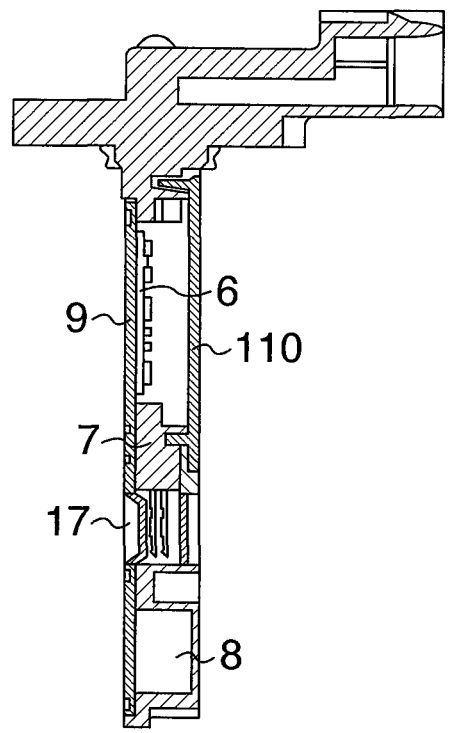
FIG. 3 is a cross-sectional view taken along a III-III line in FIG. 1.

Referring to FIGS. 1 and 2 which shows a heat resistance element type flow rate measurement apparatus in a best mode for implementing the present invention, and FIG. 3 which shows the same in a sectional view taken along a III-III line as view from thereabove, the heat resistance element type flow rate measurement apparatus comprises a measurement apparatus body 1 formed therein with a main air passage 2 and, a measuring portion having a flow rate measuring portion located in the main air passage 2, for measuring a flow rate of air flowing through the main air passage 2.

Also referring to FIGS. 1 to 3, the measuring portion has a heat resistance element 3 for measuring a flow rate, a thermosensitive resistance element 4 for detecting a temperature, a plurality of support terminals 5 for supporting the heat-resistance element 3 and the thermosensitive resistance element 4, and a circuit board 6 as an electronic circuit. In a housing 7 having cavities, on opposite sides thereof, for accommodating the circuit board 6, there are provided with a sub-passage member defining therein a U-like sub-passage 8 which supports the plurality of support terminals 5 and is opened at one side, and which incorporates the heat-resistance element 3 and the thermosensitive resistance element 4, and an aluminum base 9 made of metal, which mounts the circuit board and which covers both of the opened surface of the cavity of the housing 7 on one side and the opened surface on the one side of the sub-passage 8 being open at one side. A cover 110 is formed as a covering member for covering an opened surface of the housing 7 on the other side where the cavity is formed. The housing 7 which is an integrally molded member made of a plastic material, is composed of a frame part which defines the above-mentioned cavities for enclosing therein and protecting the circuit board 6, and a fixing part which holds the plurality of support terminals 5 for supporting the heat resistance element 3 for measuring a flow rate and the thermosensitive resistance element 4. It is noted that the thermosensitive element 4 is a resistor for detecting a temperature of intake air, the thermosensitive resistance element being arranged for controlling a temperature difference between a heating temperature of the heat resistance element 3 for measuring a flow rate and a temperature of intake air. Further, these resistive elements are welded to the support terminals 5.

Further, the sub-passage member arranged adjacent to the housing 7 has therein the sub-passage 8 composed of an inlet opening part 10, a first passage 11, a curved part 12, a second passage 13 and an outlet opening part 14. A drain hole 15 is formed between the inlet opening part 11 and the curved part 12, for prevent water from being pooled in the sub-passage 18. Further, the a stepped-like recess 17 is formed between the outlet opening part 14 and the curved part 12. The characteristic feature of the sub-passage is the provision of the flow measuring element which is hidden from the outside since the thermosensitive resistance element 4 and the heat-resistance element 3 for measuring a flow rate are arranged between the curved part 12 and the outlet opening part 14. The outlet opening part 14 is arranged, symmetrically, on both sides of the sub-passage 8 and the aluminum base 9.

Figure 4:
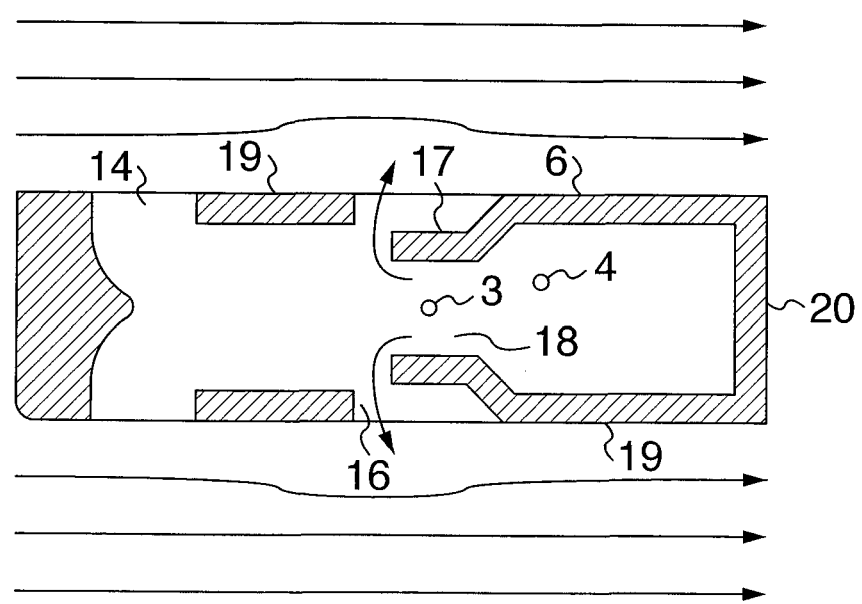
FIG. 4 is a cross-sectional view taken along a IV-IV line in FIG. 1.

Referring to FIG. 4 which shows an example of a part of the sub-passage 8 which extends from the curved part 12 to a position in the vicinity of the outlet opening part 14 in a section taken along a IV-IV line as viewed from above, the sub-passage is narrowed around the heat resistance element 3 for measuring a flow rate. The stepped-like recess 17 and a hole 16 are formed between the heat resistance element 3 for measuring a flow rate, and the outlet opening part 14 of the sub-passage. As viewed in FIG. 4 which is a sectional view, the stepped-like recesses 17 are formed on both sides of a sub-passage forming portion 20 in a part between the narrowed part 18 thereof and a passage wall surface part 19. Further, the stepped-like recess 17 arranged downstream of the heat resistance element 3 for measuring a flow rate is located between the outlet opening part 14 of the passage and the heat resistance element 3 for measuring a flow rate. Even though the separation of the air around the outlet port part 14 of the sub-passage becomes thinner, since the recess is formed downstream of the narrowed part so that the pressure in the stepped-like recess 17 becomes lower, the air can easily flow out through the hole 16 as a passage. Accordingly, the air can be discharged from the sub-passage into the main air passage 2 even though the flow rate is abruptly changed.

Figure 5:
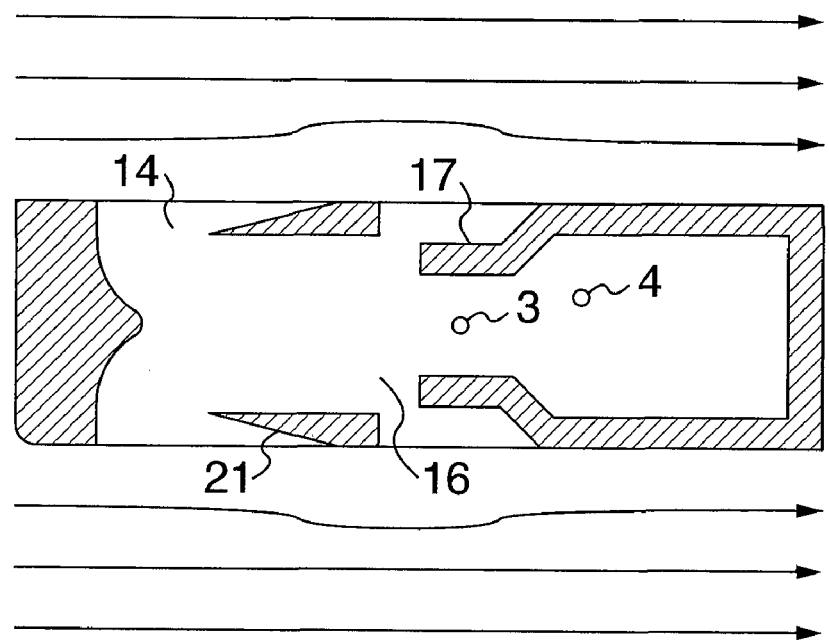
FIG. 5 is a cross-sectional view illustrating another embodiment according to the present invention, corresponding to FIG. 4.

In addition to the above-mentioned embodiment, another configuration which aims at improving the accuracy of measurement is shown in FIG. 5 which is a sectional view. Similar to the configuration shown in FIG. 4, a stepped-like recess 17 and a hole 16 are formed between a heat resistance element 3 for measuring a flow rate and an outlet opening part 14 of a sub-passage. The sub-passage has such a sectional shape, between the outlet opening part 14 and the stepped-like recess 17, that a hood effect can be obtained at each of the outlet opening part 14 and the stepped-like recess 17. Accordingly, the effect of discharging the air can be enhanced by the hood. It is noted here that although, as shown in FIG. 5, the sectional shape has a trapezoid 21, there may be any other shape if each of the outlet opening part 14 and the stepped-like recess 7 can have a hood-like sectional shape so as to exhibit the same technical effects and advantages. Thus, the air can flow out from the outlet opening part 14 of the sub-passage in a steady flow condition but can flow out from both of the outlet opening part 14 of the sub-passage and the hole 16 when the flow rate is abruptly changed.

Figure 6:
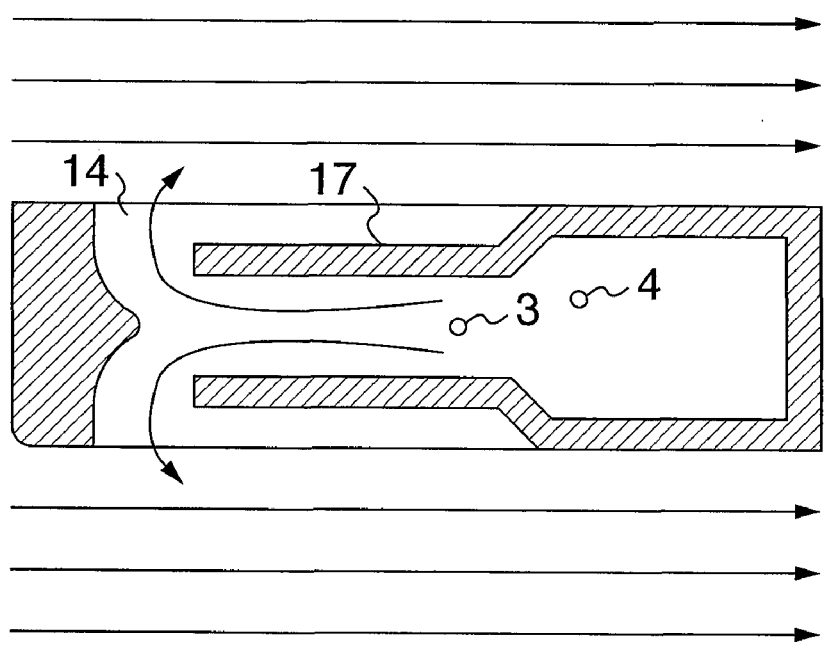
FIG. 6 is a cross-sectional view illustrating another embodiment according to the present invention, corresponding to FIG. 4.

In addition to the above-mentioned embodiments, another configuration which aims at improving the accuracy of measurement is shown in FIG. 6 which is a sectional view. FIG. 6 shows an example of a sectional view sectioned at the same position as in FIG. 4. The characteristic feature of this configuration is such that the sub-passage has a part having a narrower width in the vicinity of the heat resistance element 3 for measuring a flow rate, as shown in FIG. 4, which is extended up to the outlet of the sub-passage. With this configuration in which the width of the sub-passage is narrowed up to the outlet opening part 14 thereof, the outlet opening part 14 of the sub-passage can have a role of a hood. Thus, since no separation of the air around the outlet opening part 14 of the sub-passage is present so as to lower the pressure outside thereof, the air can easily flows out from the outlet opening part 14. Accordingly, the air can be discharged from the sub-passage into the main air passage 2 with no hindrance by the air flow in the main air passage 2 when the flow rate is abruptly changed.

Figure 7:
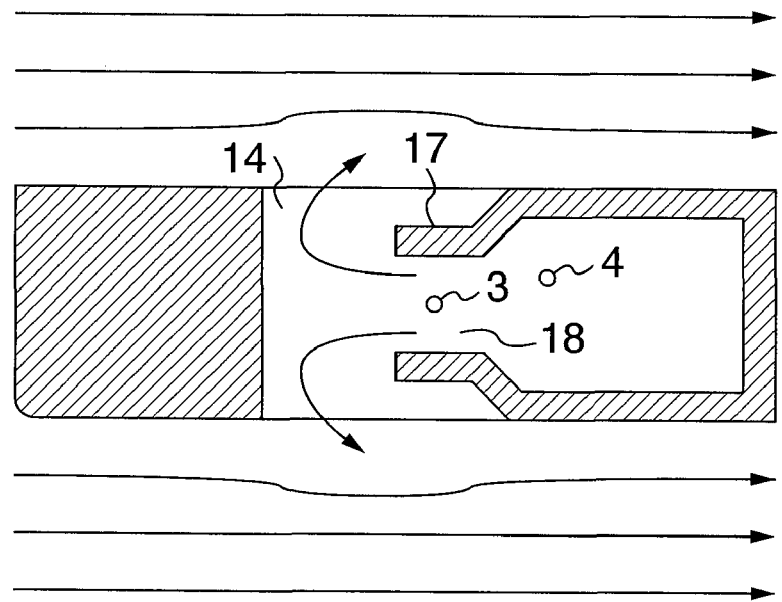
FIG. 7 is a cross-sectional view corresponding to FIG. 4, illustrating another embodiment according to the present invention.

In addition to the above-mentioned embodiments, another configuration which aims at improving the accuracy of measurement is shown in FIG. 7 which is a sectional view. FIG. 7 shows an example of a sectional view sectioned at the same position as in FIG. 4. Although the narrowed part has the same length as that shown in FIG. 1, the outlet of the sub-passage comes to a position near to the narrowed part 18 located on the upstream side of the sub-passage in comparison with the configuration shown in FIG. 4. Even in this configuration, the outlet opening part 14 can has a role of a hood, and accordingly, it can exhibit technical effects and advantages which are the same as that exhibited by the configuration shown in FIG. 4. Further, since the outlet opening part 14 comes near to the upstream side, the length of the sub-passage becomes shorter, the transmission of a transient flow can be promoted.

Figure 8:
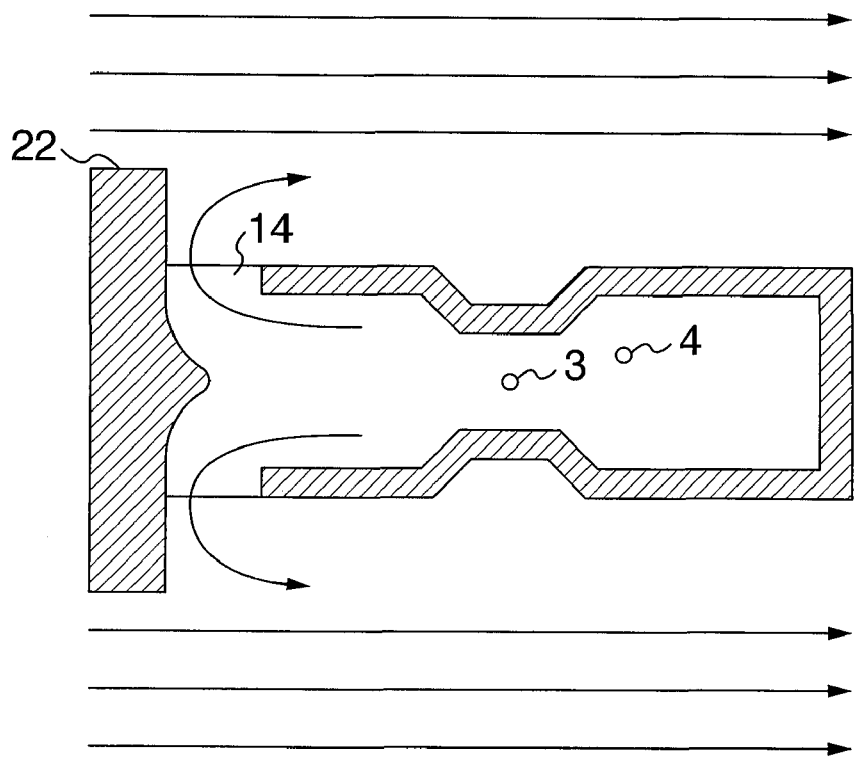
FIG. 8 is a cross-sectional view illustrating another embodiment according to the present invention, corresponding to FIG. 4.
Figure 9:
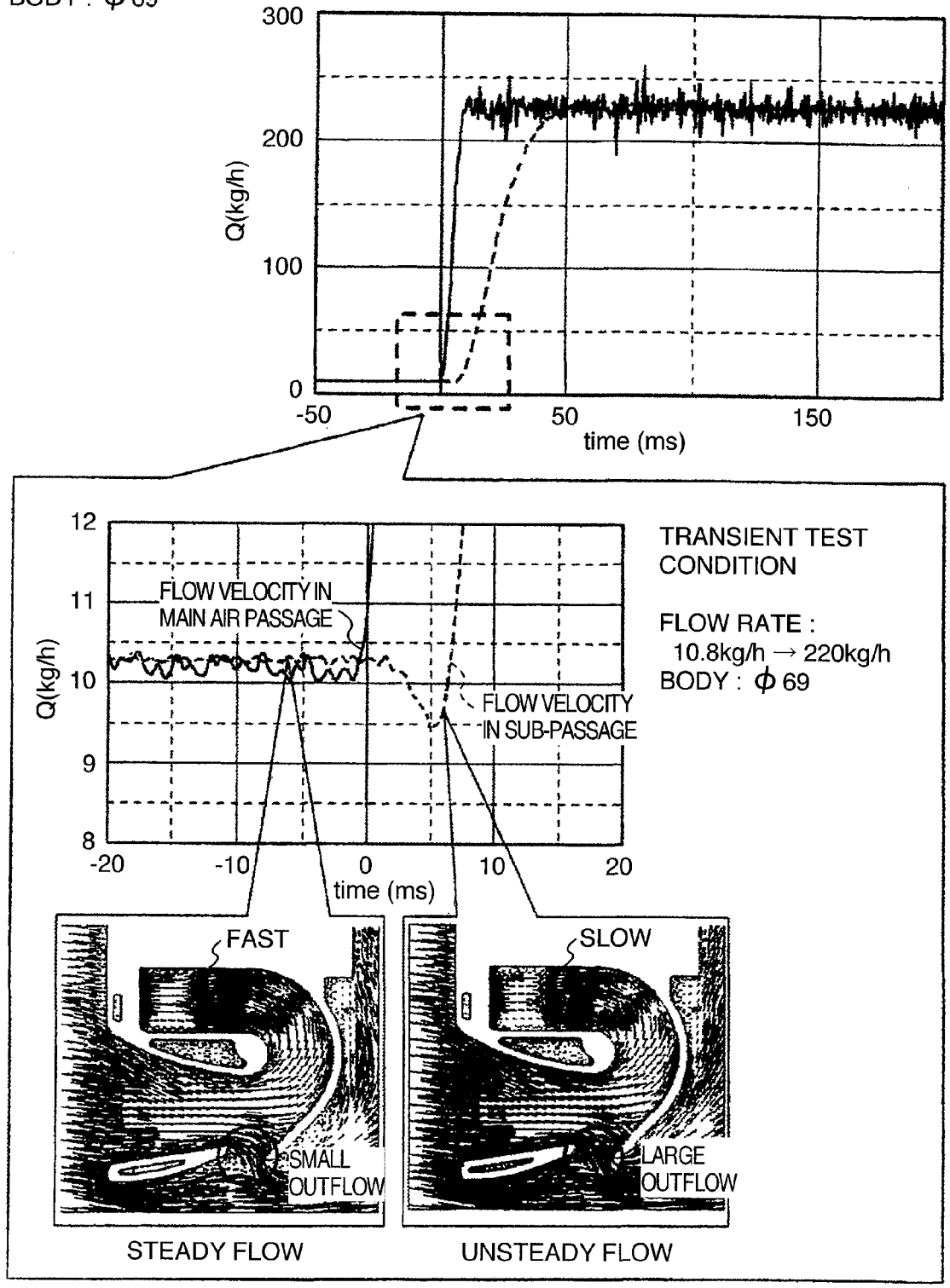
FIG. 9 is a view showing a result of flow analysis upon abrupt change in flow rate in a flow rate measurement apparatus.
Figure 10:
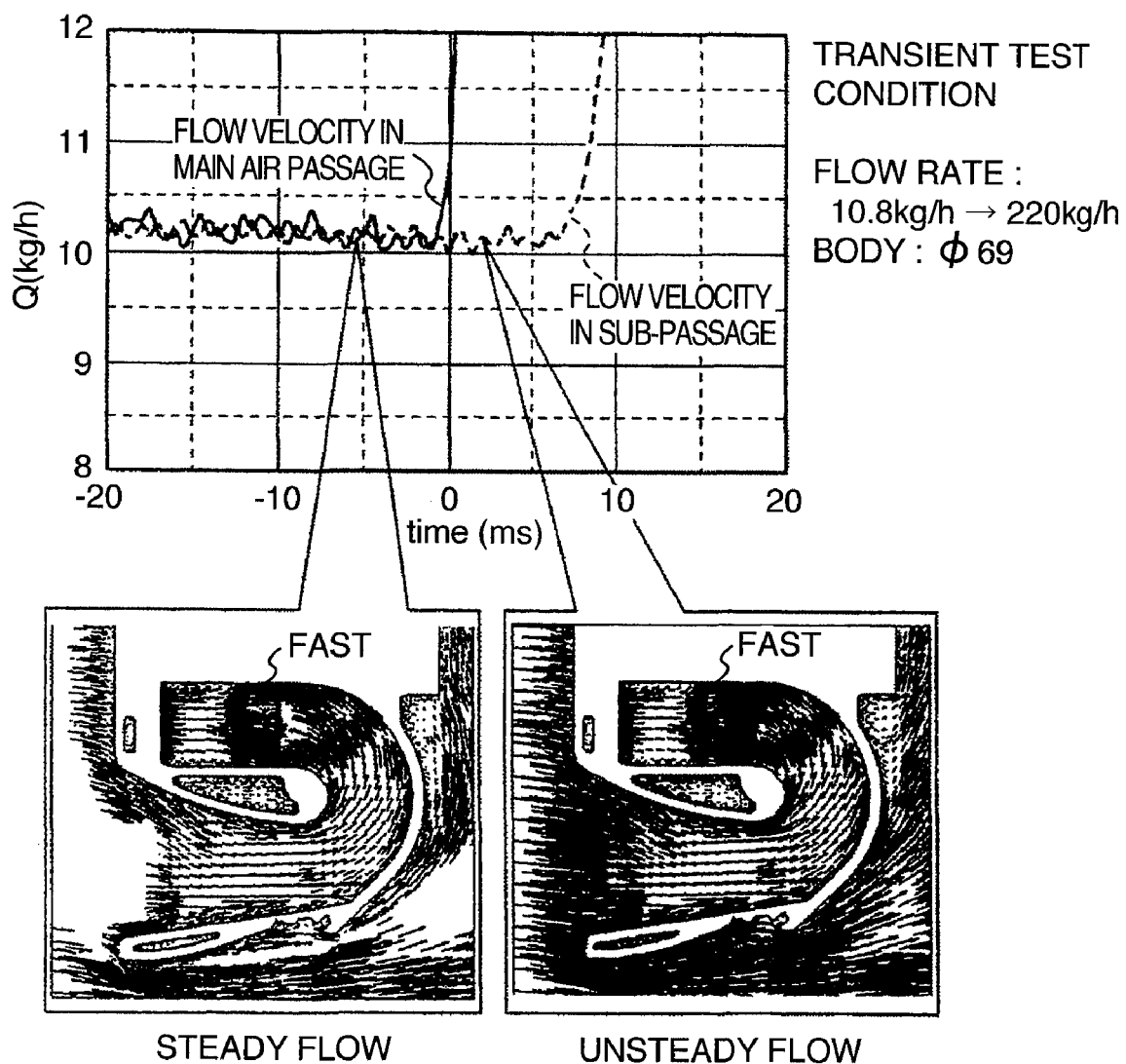
FIG. 10 is a view showing a result of flow analysis upon abrupt change in flow rate in the flow rate measurement apparatus in FIG. 9, in a condition that the drain hole is blocked.

In addition to the above-mentioned embodiments, another configuration which aims at improving the accuracy of measurement is shown in FIG. 8 which is a sectional view. FIG. 8 shows an example of a sectional view sectioned at the same position as in FIG. 3. In this configuration, the sub-passage has a narrow width around the heat resistance element 3 for measuring a flow rate so as to form a narrowed part 18. Further, at the outlet opening part 14, there is provided a protruding element 22 which can exhibit such a hood effect that the upstream end of the outlet opening part 14 is hidden by a part downstream thereof, as viewed from the main air passage. With this configuration, no separation of the air around the outlet opening part 14 of the sub-passage is present so as to lower the pressure on the outside thereof, the air can easily flow out from the outlet opening part 14. Accordingly, the air can be discharged from the sub-passage into the main air passage 2 with no hindrance by the air flow in the main air passage 2 when the flow rate is abruptly changed.

Figure 11:
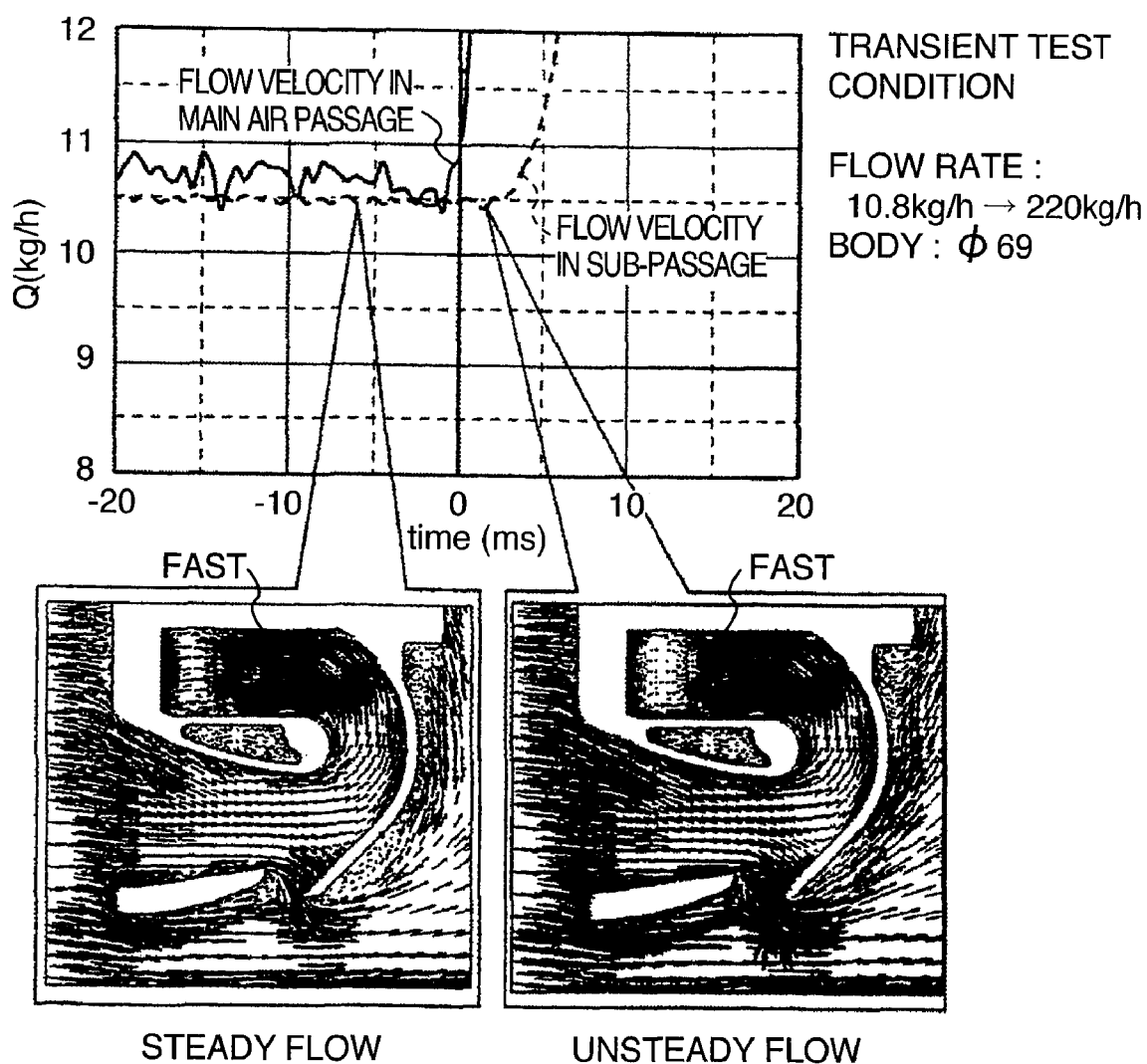
FIG. 11 is a view showing a result of flow analysis upon abrupt change in flow rate of an embodiment according to the invention.

FIG. 11 shows results of CAE experiments as to the above-mentioned embodiments. Further, the hole has such a stepped-like shape that is hidden as viewed from the upstream side of the main air passage in view of the flow therein. With the provision of the stepped-like hole, since the recess part is formed downstream of the narrowed part so as to lower the pressure outside of the stepped-like hole, the air can easily flow out from the stepped-like hole even though the separation of the air around the outlet opening part of the sub-passage becomes thinner. Thus, the flow rate (flow velocity) of the air flowing around the heat resistance portion can be ensured even when the flow rate is abruptly changed, and accordingly, it is possible to prevent the output value of the heat resistance element type flow rate measurement apparatus from falling into the negative side during a transient time.

According to the above-mentioned embodiments, it is possible to materialize such a rise-up that the output value of the heat resistance element type flow rate measurement apparatus can be prevented from falling onto the negative side even when the flow rate is abruptly changed.

Figure 12:
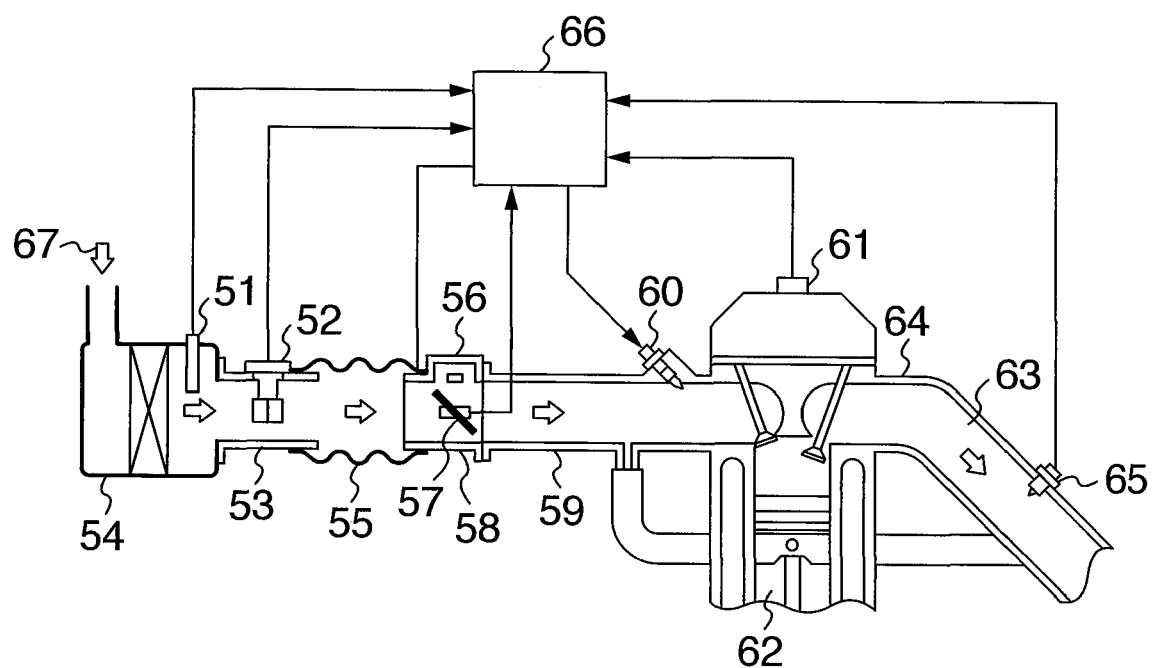
FIG. 12 is a view illustrating an embodiment according to the present invention which is applied to an electronic fuel injection type internal combustion engine.

Finally, FIG. 12 shows an example in which the present invention is applied to an electronic fuel injection type internal combustion chamber. An intake air 67 is sucked into an engine cylinder 62 from an air cleaner 54 by way of a body 53 of a heat resistance element type flow rate measurement apparatus, an intake duct 55, a throttle body 58 and an intake manifold 59 incorporating an injector 60 which is fed thereinto with a fuel. Meanwhile, a gas 63 generated in the engine cylinder 62 is exhausted by way of an exhaust manifold 64.

A control unit 66 which receives an air flow rate signal delivered from a circuit module 52 in the heat resistance element type flow rate measurement apparatus, an intake air temperature sensor signal from a temperature sensor, a throttle valve angle signal delivered from a throttle angle sensor 57, an oxygen density signal delivered from an oxygen density sensor 65 provided in the exhaust manifold 64, an engine speed sensor signal delivered from an engine speed sensor 66 and the like, serially computes an optimum fuel injection quantity and an idle air control valve opening degree from these signals, and controls the injector 60 and an idle control valve 66 in accordance with these computed values.

The present invention can be used for measuring a flow rate of substantially all various gases. In particular, it can be also used for the measurement of the quantity of air sucked into an engine or the like. Further, it can be also used for measuring the flow rate of hydrogen or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A heat resistance element type flow rate measurement apparatus comprising:
    a sub-passage constituting member defining a sub-passage having an inlet port and an outlet port, and a curved part therebetween;
    a resistance element provided in said sub-passage and heating by applying current; and
    a communicating aperture provided in said curved part of said sub-passage or upstream thereof for communicating between said sub-passage and a main passage,
    in which said resistance element is provided downstream of said curved part in said sub-passage, and an inlet port of said sub-passage is provided at a position inside of said main passage,
    wherein a second communicating aperture for communicating between said sub-passage and said main passage is provided between an outlet of said sub-passage and said resistance element,
    wherein said second communicating aperture is opened to an inside of a recess part provided on a surface of said sub-passage constituting member on said main passage side along a flow direction in said main passage,
    wherein said second communication aperture connects between an inside portion of said sub-passage on a side closer to said outlet port than said resistance element, and said main passage, and has one end opened in the vicinity of said resistance element in said sub-passage.

2. The heat resistance element type flow rate measurement apparatus as set forth in claim 1, wherein a bottom surface of said recess part is formed substantially parallel to said surface on said main passage side along the flow direction in said main passage.

3. The heat resistance element type flow rate measurement apparatus as set forth in claim 1, wherein said recess part is formed in a narrowed part of said sub-passage.

4. The heat resistance element type flow rate measurement apparatus as set forth in claim 3, wherein said resistance element is provided in said narrowed part, and
    wherein one end of said second communicating aperture is opened downstream of said resistance element in said sub-passage, and another end thereof is opened to an inside of said recess part.

5. A flow rate measurement apparatus, comprising:
    a sub-passage having an inlet port and an outlet port, and a curved part therebetween,
    a sensor provided in said sub-passage, a first passage connecting between an inside of said sub-passage on a side closer to said input port than said sensor, and a main passage, and a second passage arranged in the vicinity of said sub-passage, for promoting a flow around said sensor in said sub-passage when a flow velocity in said main passage is increased, wherein said sub-passage is arranged in the main passage so as to measure a flow rate of a gas, and wherein said second passage between an inside of said sub-passage on a side closer to said outlet port than said sensor, and said main passage, and has one end opened to the vicinity of said sensor in said sub-passage.

6. The flow rate measurement apparatus as set forth in claim 5, wherein said second passage is opened, at another end, to an inside of a recess part faced to said main passage.

7. The flow rate measurement apparatus as set forth in claim 6, wherein a part of a sub-passage constituting wall which defines said sub-passage defines a narrowed part for restricting said sub-passage around said sensor on one side thereof, and said recess part on the other side thereof.

8. The flow rate measurement apparatus as set forth in claim 7, further comprising:

a circuit board electrically connected to said sensor, and a housing defining therein said sub-passage and accommodating therein said circuit board, wherein a part of said housing is inserted through a hole formed in a main passage constituting member defining therein said main passage so as to arrange said sub-passage and said circuit board in the main passage, said outlet port is provided in said housing on a side closer to a front end thereof than said circuit board, while said inlet port is provided in the housing on a side closer to the front end than said outlet port, said curved part is formed in a substantially U-like shape, said sensor is provided in a straight passage on a side closer to said outlet port than said curved part, said first passage is provided on a side closer to said inlet port than said curved part.

9. The flow rate measurement apparatus as set forth in claim 6, further comprising:

a circuit board electrically connected to said sensor, and a housing defining therein said sub-passage and accommodating therein said circuit board, wherein a part of said housing is inserted through a hole formed in a main passage constituting member defining therein said main passage so as to arrange said sub-passage and said circuit board in the main passage, said outlet port is provided in said housing on a side closer to a front end thereof than said circuit board, while said inlet port is provided in the housing on a side closer to the front end than said outlet port, said curved part is formed in a substantially U-like shape, said sensor is provided in a straight passage on a side closer to said outlet port than said curved part, said first passage is provided on a side closer to said inlet port than said curved part.

* * * * *